United States Patent [19]
Miller

[11] 4,016,538
[45] Apr. 5, 1977

[54] SAFETY DEVICE FOR A MOTORCYCLE

[76] Inventor: Marion Z. Miller, Rte. 1 Box 76A, Arcanum, Ohio 45304

[22] Filed: Nov. 12, 1975

[21] Appl. No.: 631,407

Related U.S. Application Data

[63] Continuation-in-part of Ser. No. 552,155, Feb. 24, 1975, abandoned.

[52] U.S. Cl. .............................. 340/134; 280/293; 340/52 H
[51] Int. Cl.[2] .......................................... B62H 1/02
[58] Field of Search ................ 116/59; 307/9, 10; 340/88, 64, 134, 52 H, 61, 75, 127, 275, 282, 63; 280/293; 200/61.47, 52 A, 61.44, 61.52; 180/82 R, 103 R, 103, 104

[56] References Cited

UNITED STATES PATENTS

| | | | |
|---|---|---|---|
| 1,007,998 | 11/1911 | Whalton | 200/52 X |
| 2,300,762 | 11/1942 | Andrews | 280/293 X |
| 2,887,672 | 5/1957 | Morano et al. | 340/52 H |
| 3,034,097 | 5/1962 | English et al. | 340/52 H |
| 3,037,187 | 5/1962 | Blakistone | 340/61 |
| 3,673,562 | 6/1972 | Buell | 340/63 |
| 3,768,088 | 10/1973 | Risius | 340/282 |
| 3,788,671 | 1/1974 | MacAlpine | 340/63 X |
| 3,908,780 | 9/1975 | Mclure et al. | 180/82 R |

Primary Examiner—Richard C. Queisser
Assistant Examiner—Daniel M. Yasich
Attorney, Agent, or Firm—Dybvig & Dybvig

[57] ABSTRACT

An altering device for actuating the horn of a motorcycle if the side stand is down, the ignition is on, and the motorcycle is in the driving position.

8 Claims, 4 Drawing Figures

SAFETY DEVICE FOR A MOTORCYCLE

CROSS REFERENCE TO RELATED APPLICATION

This application is a continuation-in-part of my application Ser. No. 552,155 filed Feb. 24, 1975, now abandoned.

BACKGROUND OF THE INVENTION

This invention relates to a safety device for a motorcycle and, more particularly, to a stand-actuated alerting device to warn a motorcycle driver that the side stand of the motorcycle is down.

Motorcycles have gained enormous popularity in the past decade, and accompanying the gain in popularity has been an increase in death and injuries resulting from motorcycle accidents. The purpose of the present invention is to prevent one cause of motorcycle accidents, namely the side stand on the motorcycle being "down" in its supporting position while the motorcycle is being driven.

As most experienced motorcyclists are aware, a side stand can pose a serious threat to the safety of a motorcyclist if it is not in its "up" or stored position while the motorcycle is being driven. The danger to the motorcyclist normally is the greatest when the motorcycle is leaned by the driver to negotiate a turn and the side stand is thereby brought into contact with the ground. The contact between the ground and the side stand while the motorcycle is moving will often cause the motorcycle to jerk or spin, and, in such a situation, a motorcyclist can easily lose control of the motorcycle.

Some side stands have been designed so that if they are down and come into contact with the ground they will be immediately pushed by the ground away into their up position. However, these side stands have not eliminated the danger. Depending on how and where the ground contacts the side stand, the condition of the ground surface, and the construction of the side stand, the stand may or may not be pushed into the up position. Even if it is pushed into the up position, the momentary contact with the ground is often enough to jerk or otherwise affect the movement of the motorcycle. Even if the movement of the motorcycle is not at all affected, the driver can be startled upon hearing the side stand strike the ground and thereby be dangerously distracted.

Insofar as is known, there is no prior art teaching the installation of a safety alerting device on a motorcycle to alert a driver if the stand is down.

SUMMARY OF THE INVENTION

In accordance with the present invention, a safety device for a motorcycle is provided for alerting the driver if the stand has not been moved to its up position. The device includes a switch mechanically connected to the stand and electrically connected with the ignition, a power source, and a signal or alerting device, such as the motorcycle's horn, so that an alert can be given whenever the ignition is on and the stand is down.

Preferably, the device further includes a position responsive switch electrically connected to the stand switch so that the alert is given only when the motorcycle is brought to its upright, normal driving position. Thus in the preferred embodiment, the side stand switch and the position responsive switch are electrically connected to the horn, battery, and ignition switch of the motorcycle. The horn is actuated when the driver turns the ignition and brings the motorcycle to a substantially vertical position without putting up the side stand.

DESCRIPTION OF THE PREFERRED EMBODIMENT

Figure 1:
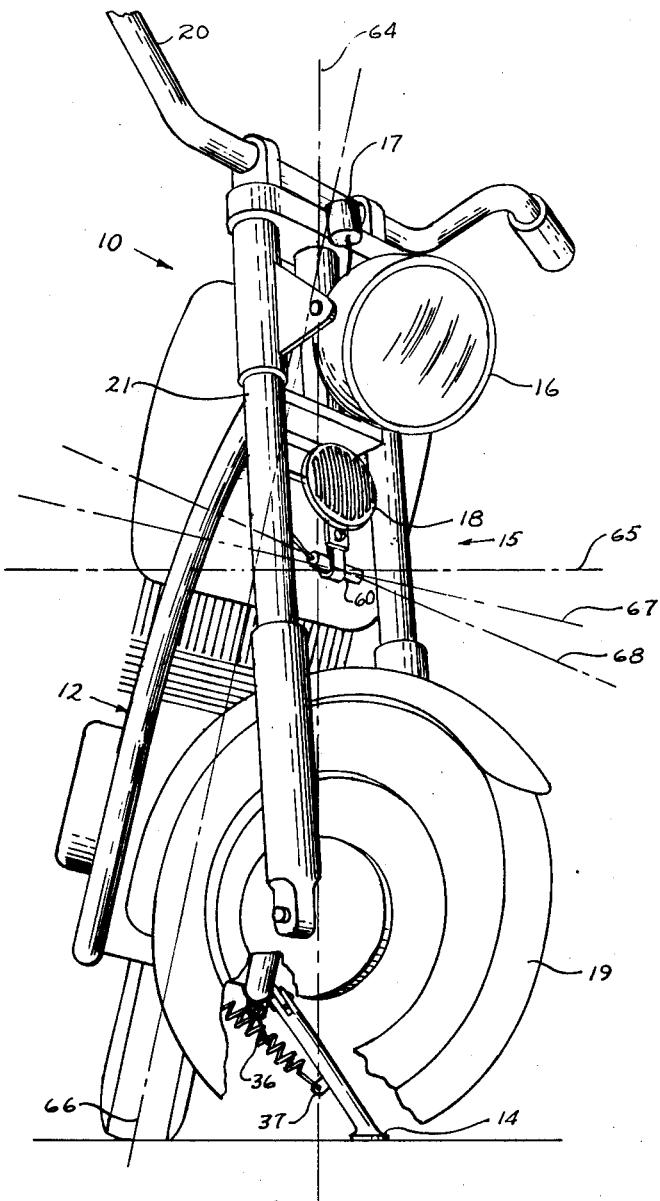
FIG. 1 is a front view of a motorcycle on which an alerting device in accordance with the invention is mounted.
Figure 2:
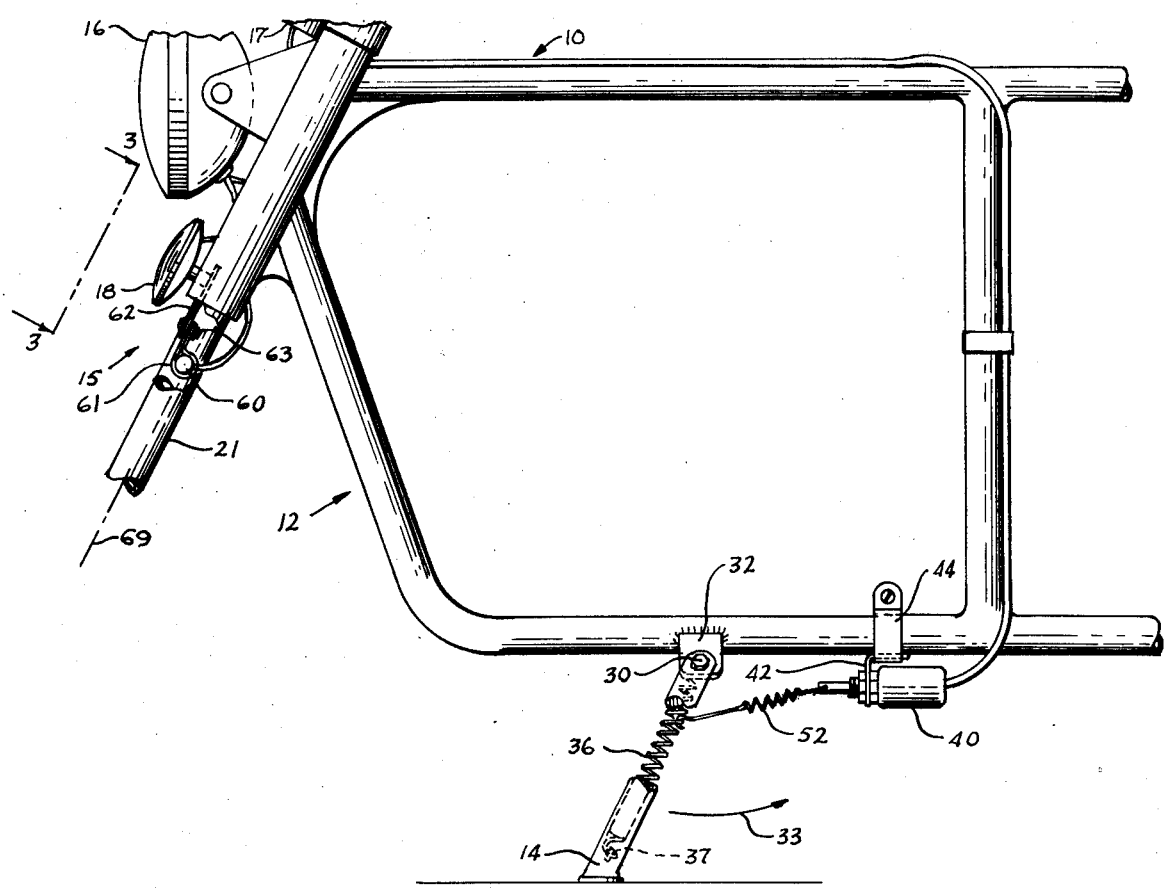
FIG. 2 is a side view of a portion of the motorcycle of FIG. 1 with parts broken away and parts omitted.
Figure 3:
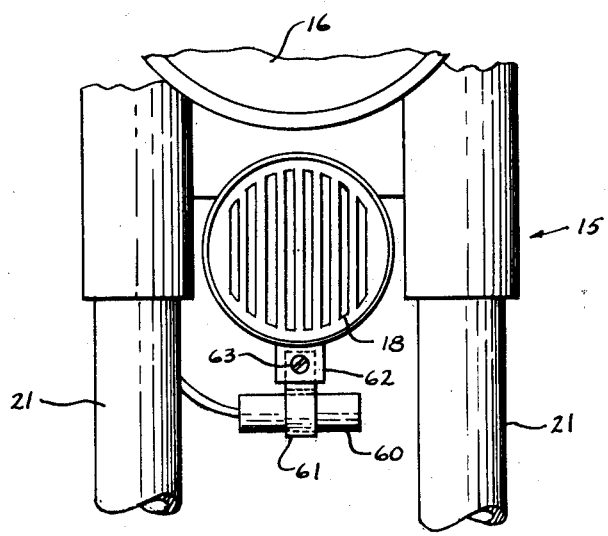
FIG. 3 is a front view of a portion of the motorcycle as viewed in the direction of arrows 3—3 of FIG. 2.

FIGS. 1, 2 and 3 illustrate a motorcycle 10 having a tubular frame assembly 12, a side stand 14, a front end assembly 15 which includes a head lamp 16, an ignition switch 17, a horn 18, a front wheel 19, and handlebars 20, all mounted on a front fork 21 pivotally mounted to the frame 12 so that the front wheel 19 can be steered by turning the handlebars 20.

Side stand 14 is attached by a bolt 30 to a mounting plate 32 on a lower portion of the frame assembly 12 and is rotatable about the axis of the bolt 30 from a down position for supporting the motorcycle, as is illustrated in FIGS. 1 and 3, along the direction of arcuate arrow 33 to an up or stored position (not shown) generally parallel to the adjacent frame portion. The movement of the side stand 14 from its down position to its up position is aided by a side stand spring 36 connected at one end to a lug 37 on the side stand 14 and at its other end to any suitable location (not shown) on the underside of the motorcycle. Because of the connection of spring 36 to the side stand 14, the positions and movement of the spring 36 will generally follow and correspond to the positions and movement of the side stand 14.

It is to be understood that the illustrated motorcycle 10 is typical of a motorcycle with which this invention may be used. Parts of the motorcycle are shown in simplified form and parts are omitted. In general, this invention may be used with all motorcycles having a stand which should be moved to an up position for safe operation. Thus for purposes of this invention, the construction and location of the illustrated parts described above are unimportant and for this reason are not described or illustrated in greater detail.

As shown in FIG. 1, the safety device of this invention includes a spring-biased side stand switch 40 having an L bracket 42 held securely to the underside of the frame assembly 12 by a hose clamp 44. Although not illustrated in the drawings, the switch 40, bracket 42 and clamp 44 could be rotated about the associated frame part so that the switch 40 would be out of view. The switch 40 may be one of any of a variety of commercially available spring-biased switches and, for example, may be a switch of the type used for motorcycle brake lights. In the illustrated embodiment, the switch 40 is normally open.

Figure 4:
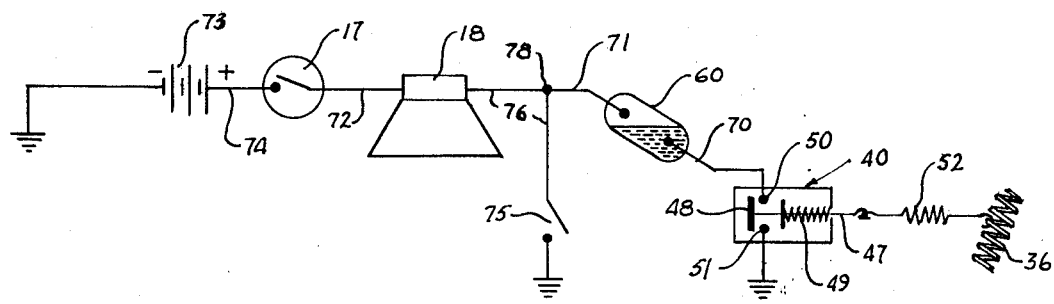
FIG. 4 is a schematic diagram of the alerting device.

With reference to FIG. 4, the illustrated switch 40 includes a slidable rod 47 terminating in a contact member 48 biased by a spring 49 away from a pair of mutually spaced contacts 50 and 51. The rod 47 is connected by a spring link 52 to the stand spring 36. Accordingly, the switch 40 is responsive to movement of the side stand 14. The switch 40 is mounted aft of the stand 14 and the connection therebetween is such that when the side stand 14 is moved toward its down position, the spring 36 and link 52 pull against the bias of switch spring 49 to thereby bring contact member 48 into engagement with contacts 50 and 51. When the side stand 14 is moved to its up position, the spring 36 and the link 52 move toward the switch 40, whereupon contact member 48 is biased by switch spring 49 away from contacts 50 and 51.

Side stands on some motorcycles may not have a spring in the same location as side stand spring 36. In such case the link 52 could be connected to the side stand itself by a clamp or other suitable fastener.

Position responsive switch means is provided for sensing whether the motorcycle 10 is in a position to start moving or in its parked, stand-supported position. Such switch means preferably comprises a mercury switch 60 mounted on the front end assembly 15. Mercury switch 60 is held by a switch clamp 61 which is attached to a bracket 62 by a bolt and nut assembly 63. The bracket 62 may be held on the front fork 21 by attachment to the horn 18. The mercury switch 60 is axially aligned with the axle of front wheel 19 and is moved between two extreme positions, one position resulting from the motorcycle being placed in its parked position when the front wheel is tilted from upright and turned, and the other position resulting from the motorcycle being moved to a straightforward driving position when the front wheel is brought upright and straightened. The switch 60 is constructed so as to be closed when the motorcycle is in its straightforward drive position and opened when the motorcycle is in its parked position.

The mercury switch 60 is preferably mounted on the front fork 21 because the front end assembly of a conventional motorcycle is that part which experiences the greatest change in orientation between a straightforward drive position and a parked position. Accordingly, the tilt of the mercury switch in the parked position is at a maximum and the switch need not be as sensitive to changes in position as would otherwise be the case. Also, a significant tilt of the mercury switch is desirable to prevent accidental closure from shock or vibration. The tilt of the mercury switch at its location on the front fork is graphically illustrated in FIG. 1, wherein line 64 represents a vertical axis, line 65 a horizontal axis, line 66 is the centerline of the frame assembly 12, line 67 is perpendicular to the frame centerline 66, and line 68 is the longitudinal axis of the mercury switch 60 which is parallel to the front wheel axle. By comparing lines 67 and 68, it can be seen that, when the motorcycle is parked, the switch 60 will tilt more if mounted on the front end assembly 15 than if mounted on the frame assembly. As will be apparent to those familiar with motorcycles, the above described characteristic of front end assembly 15, i.e. its greater movement from upright when the motorcycle is parked, is due to the pivoting of the front fork 21 about the non-vertical front fork axis 69 shown in FIG. 3.

Another advantage of locating the mercury switch 60 on the front fork is its distance from the kick starter (not shown). It has been found that with the switch 60 on the front fork, it is less subject to the sudden, temporary movements of the motorcycle frame to upright which can be caused when starting and which might cause unwanted actuation of the switch 60.

With reference to FIG. 4, one contact of each of the stand switch 40 and the mercury switch 60 are connected in electrical series by a wire 70. The other contact of the stand switch is a ground connection which, as conventional, may be made to the motorcycle frame. A simplified diagram of the usual motorcycle horn operating circuitry is included in FIG. 4. The horn 18 is connected by a conductor 72 to one terminal of ignition switch 17 and the other terminal of ignition switch 17 is connected by a conductor 74 to the positive terminal of a battery or other power source 73 which has its negative terminal grounded to the frame. The typical motorcycle horn is energized by closure of a grounded horn switch, such as that designated 75 shown connected to the horn 18 by a conductor 76.

The electrical components of this invention are connected in electrical parallel with the horn switch 75. Thus one contact of the mercury switch 60 is connected by a conductor 71 to the conductor 76 at a point 78 between horn switch 75 and horn 18. Because of the resulting series electrical connection of the battery 73, the ignition switch 17, horn 18, mercury switch 60 and the stand switch 40, the horn 18 is energized when the ignition switch is closed by the motorcycle operator, the mercury switch is closed by the motorcycle being brought to its straightforward driving position, and the stand switch is closed by side stand 14 being in its down position. Because of the relatively simple electrical and mechanical connections required, the present invention may readily be installed on existing motorcycles.

In lieu of or in addition to horn 18, other audible or visual signal devices could be used. A visual signal, such as a light mounted on or near the handlebars and clearly visible to the driver, would be helpful if the driver of the motorcycle were deaf.

Although the presently preferred embodiment of this invention has been described, it will be understood that within the purview of this invention various changes may be made within the scope of the appended claims.

Having thus described my invention, I claim:

1. An alerting device for a motorcycle having an ignition switch, a frame assembly and a stand movable from a down position for assisting in supporting said motorcycle to an up position out of said down position, said alerting device comprising:
   switch means mounted on said motorcycle and responsive to a change in position of said motorcycle and a change in position of said stand relative to said frame assembly;
   alerting signal means;
   a power source; and
   means for electrically connecting said switch means, said alerting signal means, said ignition switch and said power source so that said alerting signal means is energized when said ignition switch is actuated, said motorcycle is in a straightforward driving position, and said stand is downwardly from said up position to alert the operator of said motorcycle while riding that said stand is in an unsafe position.

2. An alerting device for a motorcycle having an ignition switch, a frame assembly, a stand movable from a down position for supporting said motorcycle to an up position out of said down position, and a power source, said alerting device comprising:
   position responsive switch means mounted on said motorcycle;
   stand switch means mounted on said motorcycle and responsive to a change in position of said stand relative to said frame assembly;

alerting signal means; and means for electrically connecting said position responsive switch means, said stand switch means, said alerting signal means, said ignition switch and said power source so that said alerting signal means is energized when said ignition switch is actuated, said motorcycle is in a straightforward driving position and said stand is downwardly from said up position to alert the operator of said motorcycle while riding that said stand is in an unsafe position.

3. The device of claim 2 wherein said position responsive switch means is a mercury switch, said mercury switch being closed when said motorcycle is in said straightforward driving position, and wherein said stand switch means is a spring-biased normally open switch, said spring-biased switch being connected to said stand so as to be closed when said stand is in said down position.

4. The device of claim 3 wherein said motorcycle includes a front fork assembly, and wherein said mercury switch is mounted on said front fork assembly.

5. The device of claim 2 wherein said connecting means connects said position responsive switch means, said stand switch means, said alerting signal means, said ignition switch and said power source in electrical series.

6. The device of claim 2 wherein said motorcycle includes an electrically energized horn, and wherein said alerting signal means is said horn.

7. The device of claim 2 wherein said stand switch means is mounted on said motorcycle and connected to said stand.

8. The device of claim 7 wherein said stand includes a stand spring and wherein said stand switch means is connected to said stand spring.

* * * * *

UNITED STATES PATENT OFFICE
CERTIFICATE OF CORRECTION

PATENT NO. : 4,016,538
DATED : April 5, 1977
INVENTOR(S) : Marion Z. Miller

It is certified that error appears in the above-identified patent and that said Letters Patent are hereby corrected as shown below:

Abstract line 1, "altering" should be ---alerting---.
Col. 2, line 28, "3" should be ---2---.

Signed and Sealed this nineteenth Day of July 1977

[SEAL]

Attest:

RUTH C. MASON
Attesting Officer

C. MARSHALL DANN
Commissioner of Patents and Trademarks